Figure 1:
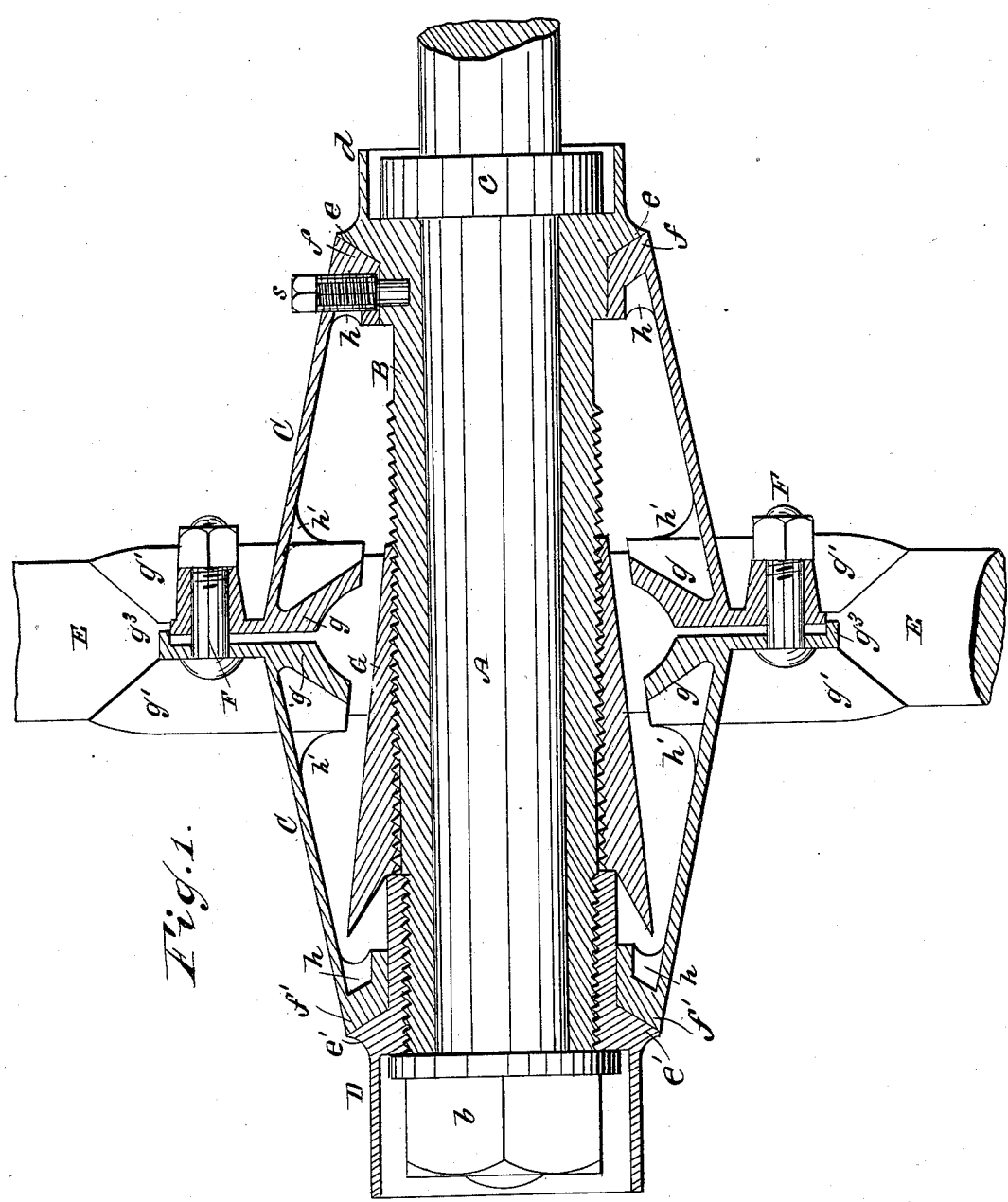

(No Model.)

2 Sheets—Sheet 1.

J. J. BUSH.
VEHICLE WHEEL.

No. 299,906. Patented June 3, 1884.

WITNESSES:

INVENTOR:
J. J. Bush
BY Munn & Co.
ATTORNEYS

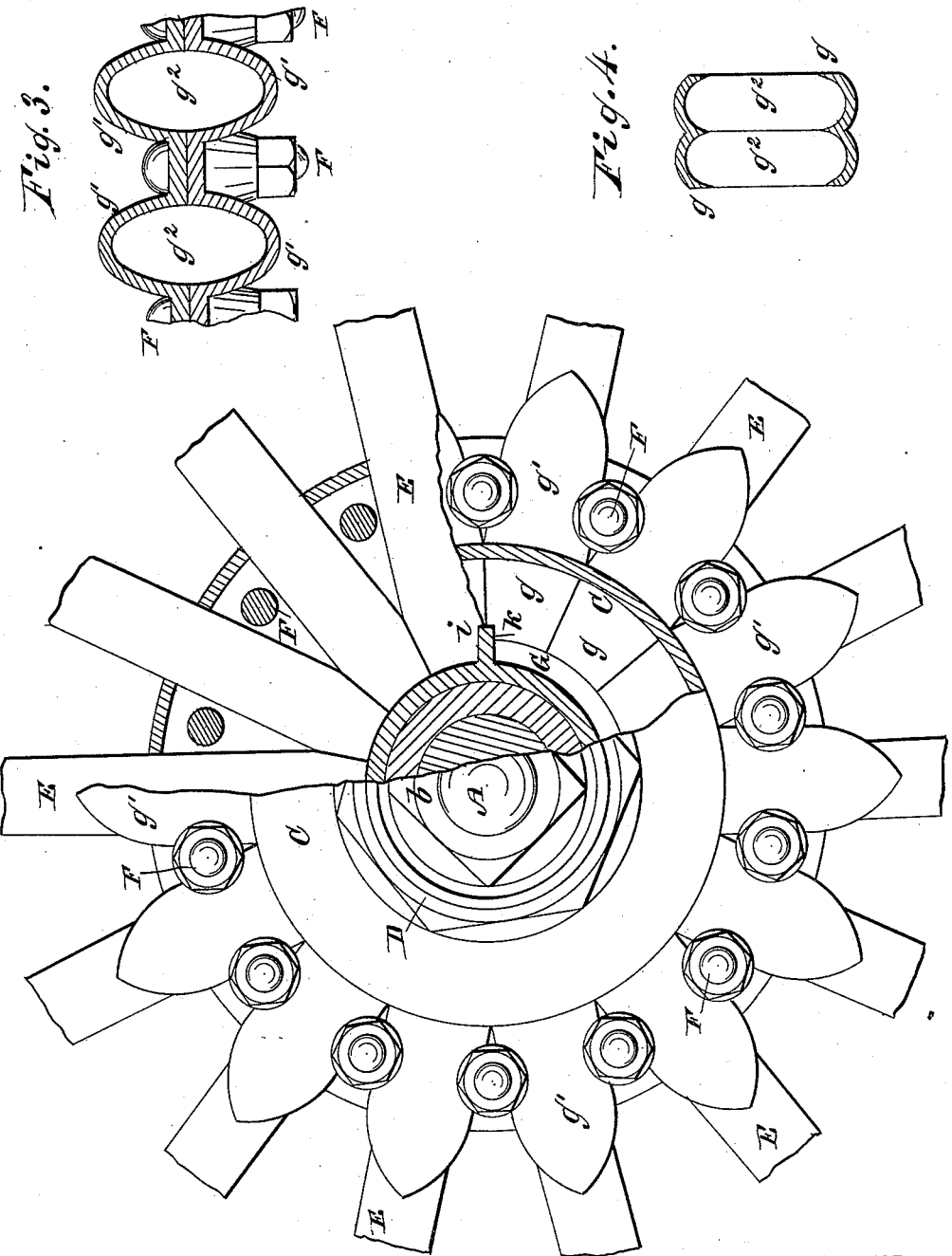

UNITED STATES PATENT OFFICE.

JAMES J. BUSH, OF TACOMA, WASHINGTON TERRITORY.

VEHICLE-WHEEL.

SPECIFICATION forming part of Letters Patent No. 299,906, dated June 3, 1884.

Application filed December 5, 1883. (No model.)

*To all whom it may concern:*

Be it known that I, JAMES J. BUSH, of Tacoma, in the county of Pierce and Territory of Washington, have invented certain new and useful Improvements in Vehicle-Wheels, of which the following is a full, clear, and exact description.

This invention relates to expansion-wheels for vehicles having transversely divided hubs, similar to the wheel for which Letters Patent No. 283,563 were issued to me August 21, 1883, and whereby, in addition to other advantages, increased facility was afforded for adjusting the wheel to its tire from time to time, as required, for putting on a tire, and for replacing the spokes of the wheel when necessary.

The invention consists in special constructions of certain details of said wheel, having for their object the improvement of the hub and strengthening of the spokes; also, whereby the axle-box is prevented from improperly turning, dirt is excluded from passing the spokes into the interior of the hub, and the wheel generally is improved.

Reference is to be had to the accompanying drawings, forming part of this specification, in which similar letters of reference indicate corresponding parts in all the figures.

Figure 1 represents a longitudinal sectional view of the hub of the wheel as fitted on its axle with my improvements applied. Fig. 2 is a broken and partly-sectional face view of the central portion of the wheel. Fig. 3 is a sectional outside end view of two of the spoke-sockets in the hub, and Fig. 4 is a sectional inside end view thereof.

A designates the axle, having the usual nut, $b$, on the outer end of the box B, and inner collar, $c$, arranged within a surrounding collar, $d$, of the box.

C C is the transversely-divided hub or independent section thereof, and which may be made of malleable cast iron, brass, or steel.

D is the screw-collar or nut that fits a screw-thread upon the box B, and which receives at its outer end the axle-nut $b$ within it.

E E are the spokes of the wheel, and F the bolts which pass between the spokes, and by which, in connection with the nut D, an effective tightening action is secured.

G is the hollow cone which screws onto the central portion of the box B, and which is moved longitudinally by turning the box, and serves to give to the wheel its expansion character, said cone having any number of exterior longitudinal ribs, $i$, working within grooves $k$ in the inner flanges, $g$ $g$, of the hub, and serving, when screwed inward, to force the spokes out. These several parts and others are generally similar to and provide for the necessary adjustment in substantially like manner as corresponding parts in the wheel for which Letters Patent, as hereinbefore referred to, were granted me; but the same or certain of them differ in shape and construction to obtain better or improved effects, and the hub, although practically the same in a general way, is of somewhat different contour. Thus the spokes E are of oval shape in transverse section where they fit within the hub which improves the construction of the hub and avoids the weakening of the spokes, inasmuch as no holes or recesses are required in the spokes for the bolts F, and the spokes are made of a diminished taper on their inner and side portions, which prevents them from working loose when expanded. The shell of the hub, too, is made to extend farther toward the ends of the box B, which gives more room for the travel of the cone G, and the collar and nut on the axle are closer to the ends of the shell of the hub. Again, instead of the hub-sections C C being strengthened internally by longitudinal ribs, they are stiffened internally at or near their ends by six (more or less) brackets, $h$ $h'$. There is also provided a set-screw, $s$, which screws into the hub and passes into the box B, to secure the box and prevent it from turning independently of the hub, the box, if desired, having a series of holes in or around it for the screw $s$ to engage with on only slightly turning the hub or box for the purpose. As in my former wheel, the box B, which goes through the hub, has an outwardly-diverging bevel-shoulder, $e$, which fits a corresponding shoulder or inwardly-turned flange, $f$, on the inner end of the hub, and the outer or opposite end of the hub has a similarly inwardly-turned flange, $f'$, which fits against an outwardly-diverging bevel-shoulder, $e'$, upon the screw collar or nut D, so that by screwing up the nut D the two sections or halves C C of the hub are tightened on the spokes E. The hub-sections C C, too, are formed with flanges $g\ g'$, arranged to extend inwardly and outwardly from the shell of the hub, and shaped internally to form sockets $g^2$ for reception of the inner end portions of the oval-shaped spokes and for hugging the spokes when the hub is tightened up; but the outer ones, $g'$, of said flanges, or of said flanges on one of the hub-sections, are constructed with annular lips or branch flanges $g^3$, arranged to close the dividing-space between the hub-sections, and so prevent dirt from passing by the spokes and between the hub-sections into the interior of the hub. I also so construct the parts that the heads of the bolts F enter between two adjacent outer flanges, $g'$, or spoke-socket portions of the hub, to prevent said bolts from turning. These bolts may be arranged between every spoke or between every other spoke, or even less frequently, if desired.

Having thus described my invention, I claim as new and desire to secure by Letters Patent—

1. In an adjustable and expanding vehicle-wheel, as described, the inner and outer flanges, $g\ g'$, of the half-hub sections C C, constructed to form tapering oval sockets $g^2$, in combination with the tapering oval-shaped spokes E and the bolts F, arranged to pass in between the spokes and free of them, substantially as specified.

2. The hub-sections C C, having inner and outer flanges, $g\ g'$, forming sockets for the spokes of the wheel, constructed or provided with outer annular lips or branch flanges, $g^3$, arranged to close the dividing-space between said hub-sections, essentially as and for the purpose herein set forth.

3. The set-screw $s$, in combination with the hub-sections C C, the box B, the hollow screw-cone G, and the axle A, substantially as specified.

4. The metallic half-hubs C C, having bodies of shell-like construction stiffened internally by end brackets, $h\ h'$, and constructed with inwardly-bent outer end flanges, $ff'$, essentially as described.

JAMES J. BUSH.

Witnesses:
LOUIS KRAFT,
A. WALTERS.